(12) United States Patent
Kambe

(10) Patent No.: US 10,384,674 B2
(45) Date of Patent: Aug. 20, 2019

(54) VEHICLE TURNING CONTROL DEVICE

(71) Applicant: TOYOTA JIDOSHA KABUSHIKI KAISHA, Toyota-shi, Aichi-Ken (JP)

(72) Inventor: Hiroki Kambe, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 102 days.

(21) Appl. No.: 15/845,315

(22) Filed: Dec. 18, 2017

(65) Prior Publication Data

US 2018/0229718 A1 Aug. 16, 2018

(30) Foreign Application Priority Data

Feb. 16, 2017 (JP) ................................. 2017-027095

(51) Int. Cl.
  *B60W 30/045* (2012.01)
  *B60W 40/068* (2012.01)
  *B60W 40/114* (2012.01)
  *B60T 8/1755* (2006.01)
  *B60T 8/17* (2006.01)

(52) U.S. Cl.
  CPC ....... *B60W 30/045* (2013.01); *B60T 8/17552* (2013.01); *B60W 40/068* (2013.01); *B60W 40/114* (2013.01); *B60T 2201/16* (2013.01); *B60T 2220/03* (2013.01); *B60T 2230/04* (2013.01); *B60W 2520/125* (2013.01); *B60W 2720/14* (2013.01)

(58) Field of Classification Search
  CPC .. B60W 30/045; B60W 40/068; B60W 10/20; B60T 8/17552; B60T 2201/16

USPC ............................................................. 701/41
  See application file for complete search history.

(56) References Cited

U.S. PATENT DOCUMENTS

| | | | | |
|---|---|---|---|---|
| 2011/0130926 A1* | 6/2011 | Lu | ........................... | B60T 8/171 701/42 |
| 2011/0307129 A1* | 12/2011 | Yu | ........................ | B60K 7/0007 701/22 |
| 2015/0158472 A1* | 6/2015 | Ohmura | .............. | B60T 8/17551 701/70 |

FOREIGN PATENT DOCUMENTS

JP       2016-020168 A       2/2016

* cited by examiner

*Primary Examiner* — Tan Q Nguyen
(74) *Attorney, Agent, or Firm* — Oliff PLC

(57) ABSTRACT

A vehicle turning control device mounted on a vehicle includes a control device that calculates a control yaw moment for increasing turning performance of the vehicle and uses a yaw moment generation device to generate the control yaw moment. A limit control yaw moment, which is an upper limit of an allowable range of the control yaw moment in which the vehicle does not spin, is a function of a lateral jerk equivalent and decreases as the lateral jerk equivalent increases. The control device calculates the limit control yaw moment based on the lateral jerk equivalent and the function, updates a hold control yaw moment with a latest value of the limit control yaw moment when the latest value is less than the hold control yaw moment, and determines the control yaw moment so as not to exceed the hold control yaw moment.

7 Claims, 15 Drawing Sheets

VEHICLE TURNING CONTROL DEVICE

BACKGROUND

Technical Field

The present disclosure relates to a vehicle turning control device that increases turning performance of a vehicle.

Background Art

Patent Literature 1 discloses a vehicle turning control device that controls turning of a vehicle. More specifically, the vehicle turning control device calculates a control target yaw moment being a target value of turning control, based on a vehicle speed and a steering angle. Furthermore, the vehicle control device estimates a road surface friction coefficient and corrects the control target yaw moment based on the estimated road surface friction coefficient. Then, the vehicle turning control device controls driving forces of left and right wheels such that the control target yaw moment is generated.

LIST OF RELATED ART

Patent Literature 1: Japanese Laid-Open Patent Publication No. 2016-20168

SUMMARY

The inventor of this application has paid attention to a steering frequency in vehicle turning. When the steering frequency is low, the vehicle is able to run relatively stably. Therefore, increase in turning performance of the vehicle is expected by the turning control as disclosed in Patent Literature 1 mentioned above.

However, when the steering frequency becomes high and a steering amplitude becomes large, the vehicle becomes unstable and thus spin of the vehicle is easy to occur. If the turning control as disclosed in Patent Literature 1 mentioned above is performed under such the situation, spin of the vehicle may occur. That is, if the turning control is performed under the situation where the steering frequency is high and the steering amplitude is large, the turning performance may be deteriorated rather than increased.

An object of the present disclosure is to provide a technique that can achieve a balance between increase in turning performance and prevention of spin occurrence in turning control of a vehicle.

A first aspect provides a vehicle turning control device mounted on a vehicle.

The vehicle turning control device includes:

a yaw moment generation device that generates a yaw moment; and a control device that calculates a control yaw moment for increasing turning performance of the vehicle and uses the yaw moment generation device to generate the control yaw moment.

A limit control yaw moment is an upper limit of an allowable range of the control yaw moment in which the vehicle does not spin.

A lateral jerk equivalent is a lateral jerk of the vehicle or an approximate value of the lateral jerk.

The limit control yaw moment is a function of the lateral jerk equivalent and decreases as the lateral jerk equivalent increases.

The control device performs:

processing of calculating the limit control yaw moment based on the lateral jerk equivalent and the function;

processing of updating a hold control yaw moment with a latest value of the limit control yaw moment, when the latest value is less than the hold control yaw moment; and processing of determining the control yaw moment so as not to exceed the hold control yaw moment.

A second aspect further has the following feature in addition to the first aspect.

A lateral acceleration equivalent is a lateral acceleration of the vehicle or an approximate value of the lateral acceleration.

The control device calculates a basic control yaw moment according to the lateral acceleration equivalent.

In the processing of determining the control yaw moment, the control device determines a smaller one of the basic control yaw moment and the hold control yaw moment as the control yaw moment.

A third aspect further has the following feature in addition to the first or second aspect.

The control device holds the hold control yaw moment until a release condition is satisfied.

A fourth aspect further has the following feature in addition to the third aspect.

The release condition is that a certain period of time elapses after the hold control yaw moment is updated with the latest value of the limit control yaw moment.

A fifth aspect further has the following feature in addition to the third aspect.

The control device calculates a delayed lateral jerk equivalent by delaying a phase of the lateral jerk equivalent.

The release condition is that the delayed lateral jerk equivalent is decreasing and the delayed lateral jerk equivalent is less than a threshold value.

A sixth aspect further has the following feature in addition to the fifth aspect.

The control device calculates the delayed lateral jerk equivalent by applying a low-pass filter to the lateral jerk equivalent.

A seventh aspect further has the following feature in addition to any one of the third sixth aspects.

After the release condition is satisfied, the control device brings the hold control yaw moment closer to the latest value of the limit control yaw moment.

According to the present disclosure, the limit control yaw moment that defines a limit under which spin of the vehicle does not occur is taken into consideration when determining the control yaw moment used in the turning control. The limit control yaw moment is given as a function of the lateral jerk (the lateral jerk equivalent) being a parameter reflecting the steering frequency and the steering amplitude. Specifically, the limit control yaw moment decreases as the lateral jerk increases. Moreover, the latest minimum value of the limit control yaw moment is held as the hold control yaw moment. Then, the control yaw moment for increasing the turning performance is determined within a range not exceeding the hold control yaw moment.

In a region where the steering frequency is high and the steering amplitude is large (i.e. the lateral jerk is high), the hold control yaw moment becomes small and thus the control yaw moment is restricted (suppressed) by the hold control yaw moment. As a result, spin of the vehicle is prevented from occurring. On the other hand, in a region where the steering frequency is low or the steering amplitude is small (i.e. the lateral jerk is low), the hold control yaw moment becomes large and thus the control yaw moment becomes a sufficiently large value without being restricted. As a result, the turning performance of the vehicle is increased. In this manner, it is possible according to the present disclosure to achieve a balance between increase in the turning performance and prevention of spin occurrence.

EMBODIMENTS

Figure 1:
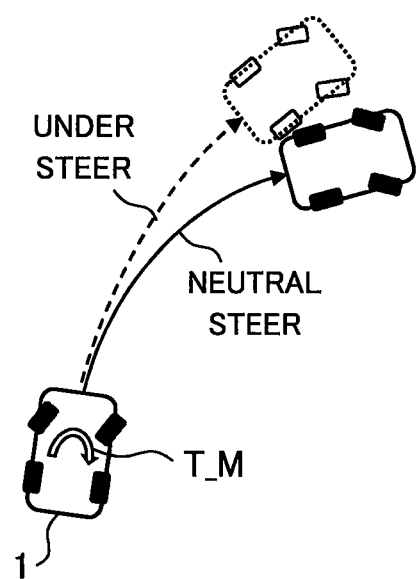
FIG. 1 is a schematic diagram for explaining turning control for increasing turning performance of a vehicle.

Embodiments of the present disclosure will be described below with reference to the attached drawings.
1. Outline FIG. 1 is a schematic diagram for explaining turning control for increasing turning performance of a vehicle 1. Generally, during a turn of the vehicle 1, an understeer tendency increases as a lateral acceleration becomes higher. In this case, by generating a control yaw moment T_M in the vehicle 1 as shown in FIG. 1, it is possible to suppress the understeer to make steering characteristics closer to neutral steer. The turning performance such as a limit lateral acceleration and a yaw rate gain is increased by such the turning control.

Figure 2:
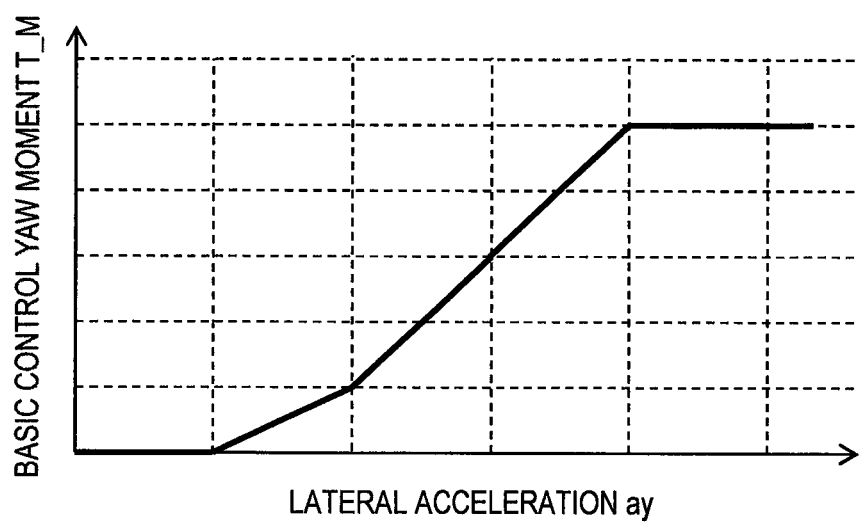
FIG. 2 is a graph chart showing an example of a correspondence relationship between a lateral acceleration and a basic control yaw moment.

FIG. 2 shows an example of a correspondence relationship between the lateral acceleration ay and the control yaw moment T_M. A horizontal axis represents the lateral acceleration ay, and a vertical axis represents the control yaw moment T_M. As described above, the understeer tendency increases as the lateral acceleration ay becomes higher. Therefore, the control yaw moment T_M is preferably designed to increase as the lateral acceleration ay becomes higher, as shown in FIG. 2. As a result, it is possible to effectively increase the turning performance. The control yaw moment T_M determined according to the lateral acceleration ay in this manner is hereinafter referred to as a "basic control yaw moment T_M".

Figure 3:
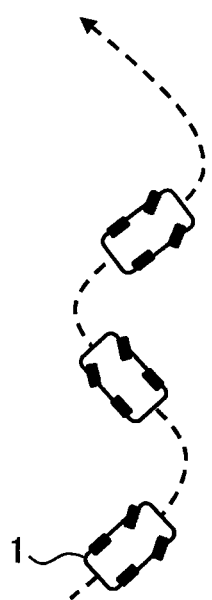
FIG. 3 is a schematic diagram illustrating slalom running of a vehicle.

The inventor of this application has paid attention to a "steering frequency" and a "steering amplitude" in vehicle turning. For example, when the vehicle 1 is in process of steady-state circular turning, a steering angle is constant and the steering frequency is zero. On the other hand, when the vehicle 1 is in process of slalom running as shown in FIG. 3, the steering angle changes rapidly, the steering frequency becomes high, and the steering amplitude becomes large. When the steering frequency is low, the vehicle 1 is able to run relatively stably. However, when the steering frequency becomes high and the steering amplitude becomes large, the vehicle 1 becomes unstable due to dynamic behavior and thus spin of the vehicle 1 is easy to occur.

Figure 4:
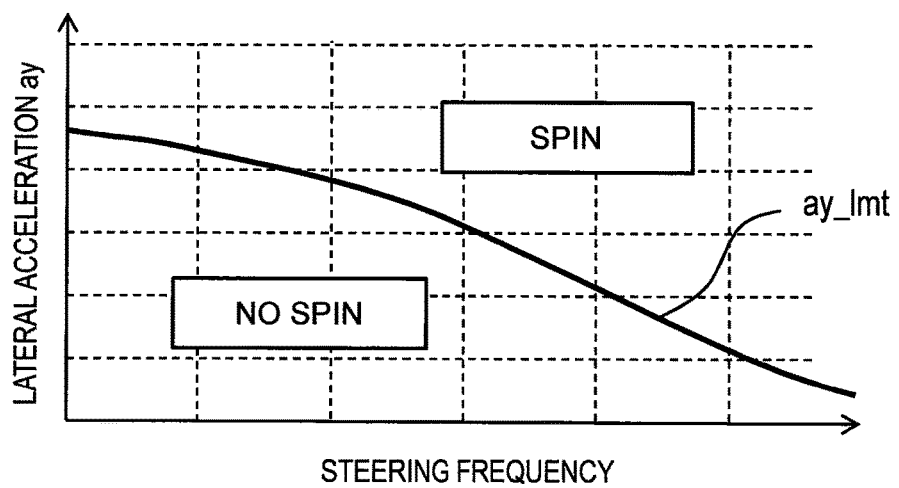
FIG. 4 is a graph chart for explaining an allowable range of a lateral acceleration in which spin of a vehicle does not occur.

FIG. 4 is a graph chart for explaining an allowable range of the lateral acceleration ay in which spin of the vehicle 1 does not occur. A horizontal axis represents the steering frequency, and a vertical axis represents the lateral acceleration ay. In addition, "ay_lmt" in FIG. 4 indicates an upper limit of the allowable range of the lateral acceleration ay in which spin of the vehicle 1 does not occur. When the lateral acceleration ay is equal to or lower than the upper limit ay_lmt, spin of the vehicle 1 does not occur. On the other hand, when the lateral acceleration ay exceeds the upper limit ay_lmt, spin of the vehicle 1 occurs. As shown in FIG. 4, there is a tendency that the upper limit ay_lmt decreases as the steering frequency becomes higher.

In a frequency range where the steering frequency is low, the upper limit ay_lmt of the allowable range of the lateral acceleration ay is large. Therefore, even when the lateral acceleration ay is high, the vehicle 1 is able to run stably. In this case, it is possible to increase the turning performance of the vehicle 1 by performing the turning control shown in FIGS. 1 and 2.

However, in a frequency range where the steering frequency is high, the upper limit ay_lmt of the allowable range of the lateral acceleration ay is small and thus spin of the vehicle 1 is easy to occur. In other words, as the steering frequency and the lateral acceleration ay becomes higher, the spin is more likely to occur. Therefore, if a large basic control yaw moment T_M is generated according to the lateral acceleration ay, spin of the vehicle 1 may occur. That is, if the turning control is performed under the situation where the steering frequency is high and the steering amplitude is large, the turning performance may be deteriorated rather than increased.

In view of the above, the control yaw moment generated in the turning control in the present embodiment is adjusted according the steering frequency and the steering amplitude. In particular, when the steering frequency is high and the steering amplitude is large, the control yaw moment to be generated is restricted (suppressed). To that end, let us consider an allowable range of the control yaw moment in which the vehicle 1 does not spin. An upper limit of the allowable range of the control yaw moment in which the vehicle 1 does not spin is hereinafter referred to as a "limit control yaw moment A_M", in order to distinguish it from the basic control yaw moment T_M shown in FIG. 2. The limit control yaw moment A_M is given as a function of the steering frequency and the steering amplitude.

In addition, in the present embodiment, a "lateral jerk Jy" is used as a parameter reflecting the steering frequency and the steering amplitude. The lateral jerk Jy is the time derivative of the lateral acceleration ay. For example, when the vehicle 1 is in process of steady-state circular turning, the lateral acceleration ay is constant and thus the lateral jerk Jy is zero as well as the steering frequency. On the other hand, when the steering frequency is high and the steering amplitude is large, the lateral acceleration ay rapidly changes according to the change in the steering angle, and thus the lateral jerk Jy also becomes high. The above-described limit control yaw moment A_M is given as a function of the lateral jerk Jy.

Figure 5:
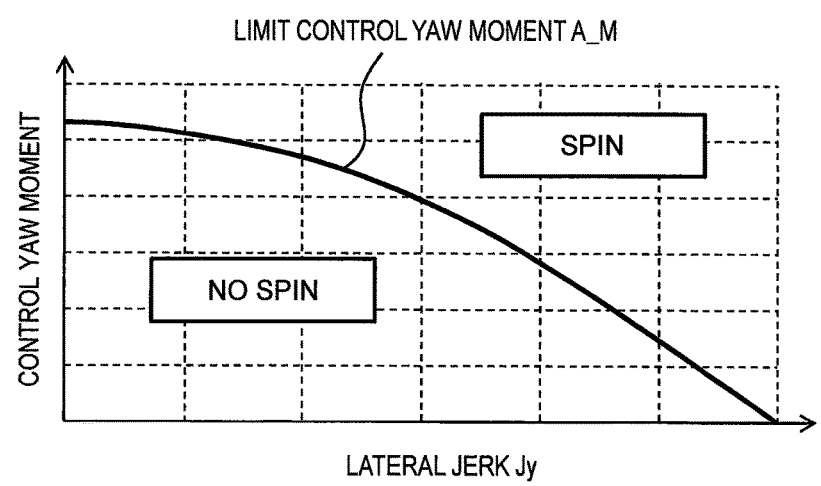
FIG. 5 is a graph chart showing a relationship between a limit control yaw moment and a lateral jerk which are used in an embodiment of the present disclosure.

FIG. 5 shows a relationship between the limit control yaw moment A_M and the lateral jerk Jy which are used in the present embodiment. A horizontal axis represents the lateral jerk Jy, and a vertical axis represents the control yaw moment. When the control yaw moment is equal to or less than the limit control yaw moment A_M, spin of the vehicle 1 does not occur. On the other hand, when the control yaw moment exceeds the limit control yaw moment A_M, spin of the vehicle 1 occurs. As shown in FIG. 5, the limit control yaw moment A_M is a function of the lateral jerk Jy. More specifically, as the lateral jerk Jy increases, the limit control yaw moment A_M decreases.

In the turning control according to the present embodiment, both of the basic control yaw moment T_M shown in FIG. 2 and the limit control yaw moment A_M shown in FIG. 5 are taken into consideration. The basic control yaw moment T_M, which is the control yaw moment for increasing the turning performance, is sequentially calculated based on the lateral acceleration ay (see FIG. 2). On the other hand, the limit control yaw moment A_M, which is for limiting (restricting) the control yaw moment from a viewpoint of preventing the spin occurrence, is sequentially calculated based on the lateral jerk Jy (see FIG. 5). By comparing the basic control yaw moment T_M and the limit control yaw moment A_M to determine the control yaw moment, it is possible to achieve a balance between increase in the turning performance and prevention of the spin occurrence.

Note however that the spin occurrence cannot be appropriately prevented just by simply comparing the basic control yaw moment T_and the limit control yaw moment A_M. The reason is described with reference to FIG. 6 and so forth.

Figure 6:
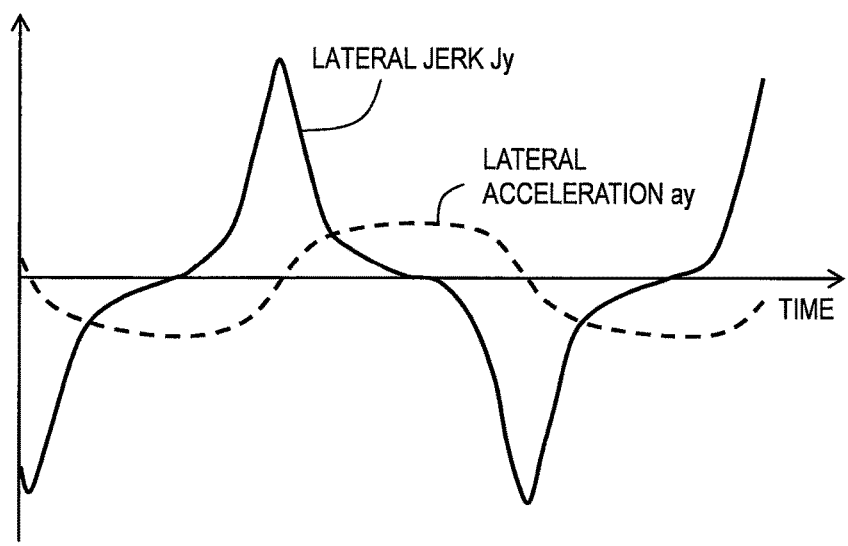
FIG. 6 is a graph chart for explaining a phase difference between the lateral acceleration and the lateral jerk.

As shown in FIG. 6, a phase of the lateral jerk Jy being the time derivative of the lateral acceleration ay is earlier than a phase of the lateral acceleration ay. Therefore, the lateral jerk Jy is low when the lateral acceleration ay is high. When the lateral acceleration ay is high, spin of the vehicle 1 is likely to occur (see FIG. 4) and therefore it is desirable to restrict (suppress) the control yaw moment in order to prevent the spin. However, at this time, the lateral jerk Jy is low and thus the limit control yaw moment A_M calculated from the lateral jerk Jy becomes large (see FIG. 5). The limit control yaw moment A_M being large means that the effect of restricting the control yaw moment is small. Therefore, using the limit control yaw moment A_M being synchronized with the lateral jerk Jy cannot appropriately prevent the spin occurrence.

In order to solve such the problem caused by the difference in phase between the lateral acceleration ay and the lateral jerk Jy, a "hold control yaw moment H_M" is used in the present embodiment. The hold control yaw moment H_M is a latest minimum value of the limit control yaw moment A_M and held until a predetermined release condition is satisfied. Details of the release condition will be described later.

Figure 7:
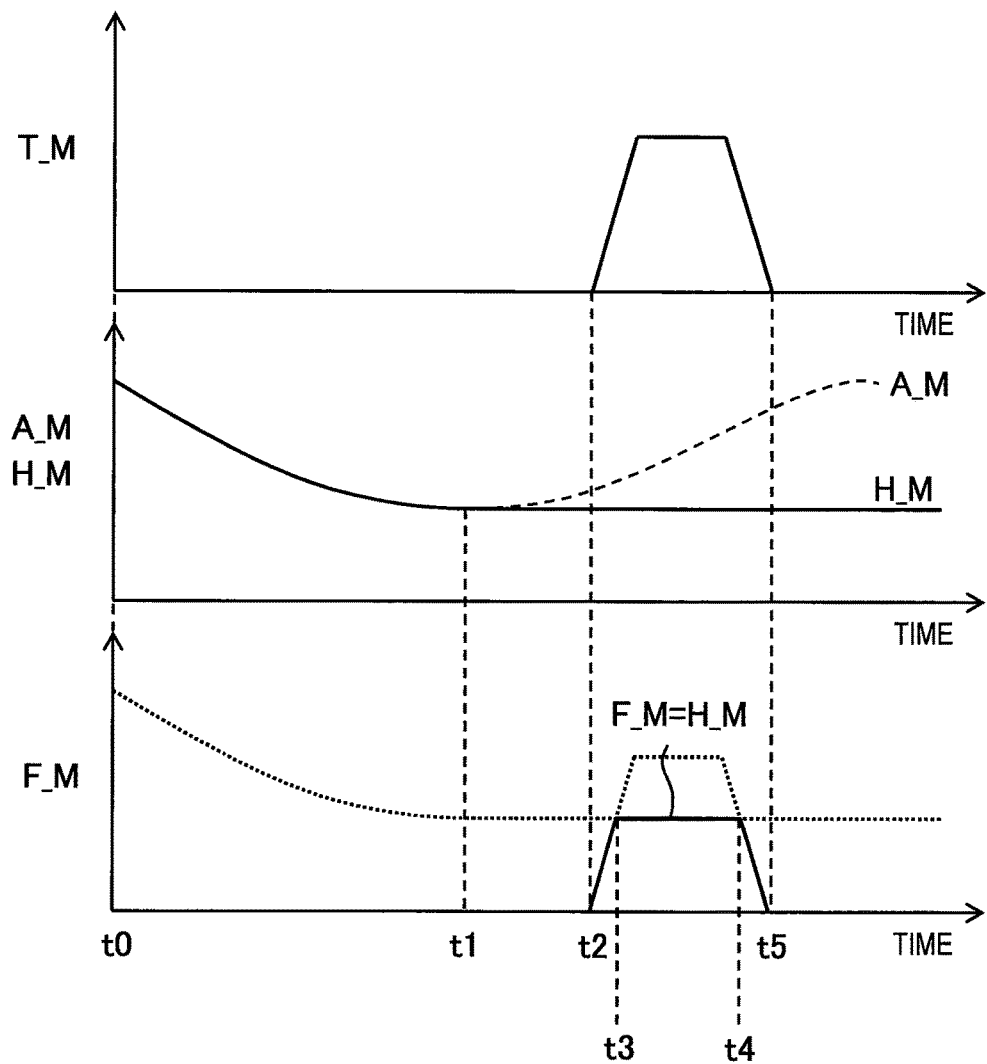
FIG. 7 is timing chart for explaining a control yaw moment used in the turning control according to the embodiment of the present disclosure.

The hold control yaw moment H_M will be described in more detail with reference to FIG. 7. A middle row of FIG. 7 shows an example of time variations of the limit control yaw moment A_M and the hold control yaw moment H_M. The limit control yaw moment A_M is sequentially calculated based on the lateral jerk Jy (see FIG. 5). On the other hand, the hold control yaw moment H_M is the latest minimum value of the limit control yaw moment A_M. When a latest value of the limit control yaw moment A_M is less than the hold control yaw moment H_M, the hold control yaw moment H_M is updated with the latest value of the limit control yaw moment A_M.

During a period from a time t0 to a time t1, the lateral jerk Jy increases and the calculated limit control yaw moment A_M gradually decreases. As a result, the hold control yaw moment H_M is sequentially updated and gradually decreases as well.

After the time t1, the lateral jerk Jy decreases and the calculated limit control yaw moment A_M gradually increases. Whereas, the hold control yaw moment H_M does not change and is kept at the latest minimum value of the limit control yaw moment A_M. The hold control yaw moment H_M is maintained until a predetermined release condition to be described later is satisfied.

A top row of FIG. 7 shows an example of a time variation of the basic control yaw moment T_M. The basic control yaw moment T_M is sequentially calculated based on the lateral acceleration ay (see FIG. 2). The lateral acceleration ay whose phase is later than that of the lateral jerk Jy increases after the time t1. Then, during a period from a time t2 to a time t5, values that are not zero are calculated as the basic control yaw moment T_M.

According to the present embodiment, a comparison of the basic control yaw moment T_M and the hold control yaw moment H_M is made. Then, a smaller one of the basic control yaw moment T_and the hold control yaw moment H_M is used as a "control yaw moment F_M" in the turning control according to the present embodiment. In other words, the control yaw moment F_M for increasing the turning performance is determined within a range not exceeding the hold control yaw moment H_M.

A bottom row of FIG. 7 shows an example of a time variation of the control yaw moment F_M. During a period from the time t2 to a time t3, the basic control yaw moment T_M is less than the hold control yaw moment H_M. Therefore, the basic control yaw moment T_M is used as the control yaw moment F_M (i.e. F_M=T_M). As a result, the turning performance increases.

During a period from the time t3 to a time t4, the basic control yaw moment T_is equal to or greater than the hold control yaw moment H_M. Therefore, the hold control yaw moment H_M is used as the control yaw moment F_M (i.e. F_M=H_M). As a result, spin of the vehicle 1 is prevented.

During a period from the time t4 to the time t5, the basic control yaw moment T_M becomes less than the hold control yaw moment H_M again. Therefore, the basic control yaw moment T_M is used as the control yaw moment F_M (i.e. F_M=T_). As a result, the turning performance increases.

Figure 8:
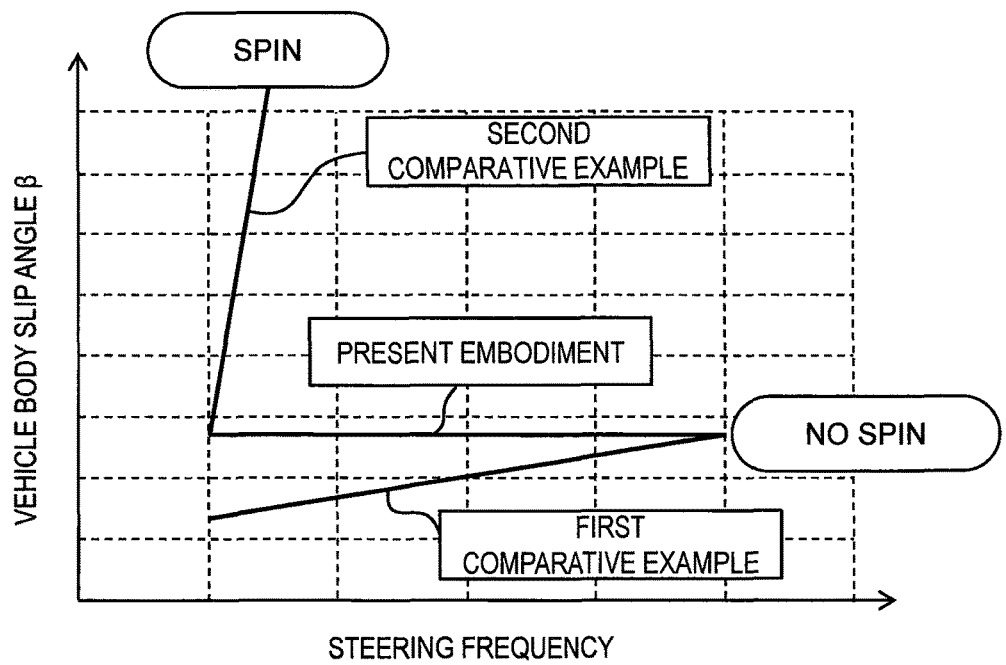
FIG. 8 is a graph chart for explaining an effect according to the embodiment of the present disclosure.

FIG. 8 is a graph chart for explaining an effect according to the present embodiment. A horizontal axis represents the steering frequency, and a vertical axis represents a vehicle body slip angle β (vehicle body side-slip angle) of the vehicle 1. It should be noted that the steering amplitude is set to be constant at any steering frequency. In order to explain the effect according to the present embodiment, we first describe comparative examples.

As a first comparative example, let us consider a case where the turning control for increasing the turning performance of the vehicle 1 is not carried out. In this case, the basic control yaw moment T_M as shown in FIGS. 1 and 2 is not applied to the vehicle 1. Therefore, spin occurrence is suppressed even in the frequency range where the steering frequency is high. However, the turning performance does not increase in the frequency range where the steering frequency is low.

Next, as a second comparative example, let us consider a case where the turning control is carried out by using only the basic control yaw moment T_M (see also FIG. 1). In this case, the turning performance of the vehicle 1 increases in the frequency range where the steering frequency is low. However, in the frequency range where the steering frequency is high, the spin of the vehicle 1 occurs due to the above-described reasons. That is, the turning performance is rather deteriorated by the turning control.

Next, let us consider the case of the present embodiment. As shown in FIG. 8, the turning performance of the vehicle 1 increases in the frequency range where the steering frequency is low, as in the case of the second comparative example. Moreover, in the frequency range where the steering frequency is high, the spin occurrence is prevented and vehicle stability is secured, as in the case of the first comparative example. That is, both increase in the turning performance and prevention of the spin occurrence are achieved according to the present embodiment.

According to the present embodiment, as described above, the limit control yaw moment A_M that defines a limit under which spin of the vehicle 1 does not occur is taken into consideration when determining the control yaw moment F_M used in the turning control. The limit control yaw moment A_M is given as a function of the lateral jerk Jy being a parameter reflecting the steering frequency and the steering amplitude. Specifically, the limit control yaw moment A_M decreases as the lateral jerk Jy increases. Moreover, the latest minimum value of the limit control yaw moment A_M is held as the hold control yaw moment H_M. Then, the control yaw moment F_M for increasing the turning performance is determined within a range not exceeding the hold control yaw moment H_M.

In the region where the steering frequency is high and the steering amplitude is large (i.e. the lateral jerk Jy is high), the hold control yaw moment H_M becomes small and thus the control yaw moment F_M is restricted (suppressed) by the hold control yaw moment H_M. As a result, spin of the vehicle 1 is prevented from occurring. On the other hand, in the region where the steering frequency is low or the steering amplitude is small (i.e. the lateral jerk Jy is low), the hold control yaw moment H_M becomes large and thus the control yaw moment F_M becomes a sufficiently large value without being restricted. As a result, the turning performance of the vehicle 1 is increased. In this manner, it is possible according to the present embodiment to achieve a balance between increase in the turning performance and prevention of spin occurrence.

2. Configuration Example of Vehicle Turning Control Device

Figure 9:
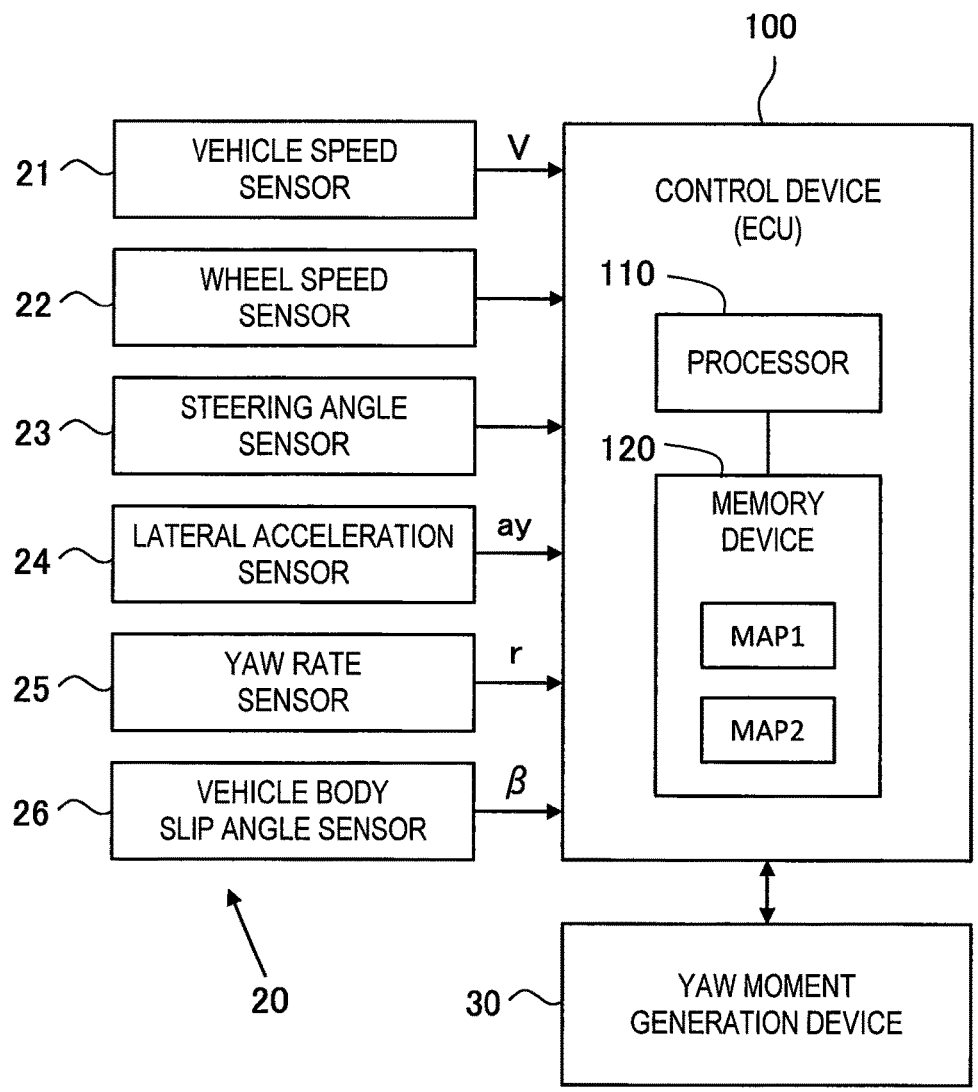
FIG. 9 is a block diagram showing a configuration example of a vehicle turning control device according to the embodiment of the present disclosure.

FIG. 9 is a block diagram showing a configuration example of a vehicle turning control device 10 according to the present embodiment. The vehicle turning control device 10 is mounted on the vehicle 1 and performs the turning control for increasing the turning performance of the vehicle 1.

More specifically, the vehicle turning control device 10 is provided with a sensor group 20, a yaw moment generation device 30, and a control device 100. The sensor group 20 includes a vehicle speed sensor 21, a wheel speed sensor 22, a steering angle sensor 23, a lateral acceleration sensor 24, a yaw rate sensor 25, and a vehicle body slip angle sensor 26.

The vehicle speed sensor 21 detects a vehicle speed V that is a speed of the vehicle 1. The vehicle speed sensor 21 outputs detected information indicating the detected vehicle speed V to the control device 100.

The wheel speed sensor 22 is provided with respect to each wheel of the vehicle 1 and detects a rotational speed of the corresponding wheel. The wheel speed sensor 22 outputs detected information indicating the detected rotational speed to the control device 100.

The steering angle sensor 23 detects a steering angle of a steering wheel of the vehicle 1. The steering angle sensor 23 outputs detected information indicating the detected steering angle to the control device 100.

The lateral acceleration sensor 24 detects the lateral acceleration ay acting on the vehicle 1. The lateral acceleration sensor 24 outputs detected information indicating the detected lateral acceleration ay to the control device 100.

The yaw rate sensor 25 detects a yaw rate r (rotation angular velocity) of the vehicle 1. The yaw rate sensor 25 outputs detected information indicating the detected yaw rate r to the control device 100.

The vehicle body slip angle sensor 26 detects the vehicle body slip angle (vehicle body side-slip angle) of the vehicle 1. The vehicle body slip angle sensor 26 outputs detected information indicating the detected vehicle body slip angle $\beta$ to the control device 100.

The yaw moment generation device 30 is a mechanism that generates a yaw moment of the vehicle 1. For example, the yaw moment generation device 30 is either a driving device or a braking device. Alternatively, the yaw moment generation device 30 may be a combination of a driving device and a braking device.

The driving device is configured to be able to individually control respective driving forces of left and right driving wheels. For example, the driving device includes in-wheel motors arranged near the driving wheels. By using the driving device to appropriately control a difference in driving force between the left and right driving wheels, the control device 100 can generate a desired yaw moment.

The braking device is configured to be able to individually control respective braking forces of wheels. Typically, the braking device includes a brake actuator that is capable of individually controlling respective pressures of brake fluids supplied to wheel cylinders of the wheels. By using the braking device to appropriately control a difference in braking force between the left side and the right side of the vehicle, the control device 100 can generate a desired yaw moment.

The control device 100 performs the turning control for increasing the turning performance of the vehicle 1. Typically, the control device 100 is a microcomputer including a processor 110, a memory device 120, and an input/output interface. The control device 100 is also called an ECU (Electronic Control Unit). The turning control according to the present embodiment is realized by the processor 110 executing a control program stored in the memory device 120.

More specifically, the control device 100 receives a variety of information through the input/output interface. The variety of information includes the detected information sent from the sensor group 20. Based on the received information, the control device 100 calculates the control yaw moment F_M for increasing the turning performance of the vehicle 1. It can be also said that the control yaw moment F_M is a yaw moment for making steering characteristics closer to neutral steer (see FIG. 1). Then, the control device 100 uses the yaw moment generation device 30 to generate the control yaw moment F_M.

In calculating the control yaw moment F_M, a basic control yaw moment map MAP1 and a limit control yaw moment map MAP2 may be used. As shown in FIG. 2, the basic control yaw moment T_M is given as a function of the lateral acceleration ay. The basic control yaw moment map MAP1 is a map defining such the relationship between the lateral acceleration ay and the basic control yaw moment T_M. The basic control yaw moment map MAP1 is created in advance and stored in the memory device 120 of the control device 100. The control device 100 can calculate the basic control yaw moment T_M based on the detected information sent from the sensor group 20 and the basic control yaw moment map MAP1.

On the other hand, as shown in FIG. 5, the limit control yaw moment A_M is given as a function of the lateral jerk Jy. The limit control yaw moment map MAP2 is a map defining such the relationship between the lateral jerk Jy and the limit control yaw moment A_M. The limit control yaw moment map MAP2 is created in advance and stored in the memory device 120 of the control device 100. The control device 100 can calculate the limit control yaw moment A_M based on the detected information sent from the sensor group 20 and the limit control yaw moment map MAP2.

Hereinafter, the turning control performed by the vehicle turning control device 10 according to the present embodiment will be described in more detail.

3. Processing Flow of Turning Control

Figure 10:
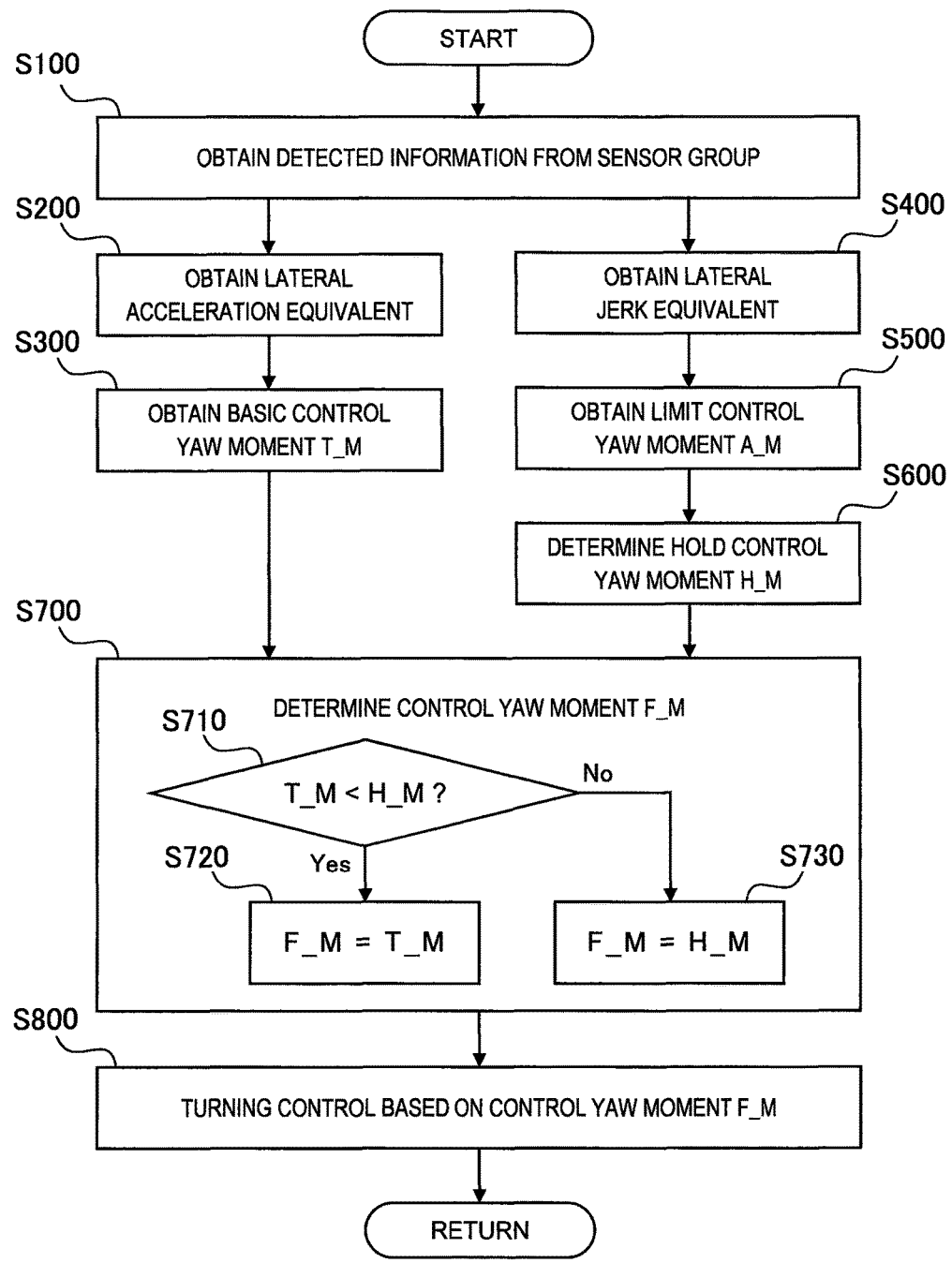
FIG. 10 is a flow chart showing the turning control performed by the vehicle turning control device according to the embodiment of the present disclosure.

FIG. 10 is a flow chart showing the turning control performed by the vehicle turning control device 10 according to the present embodiment. The processing flow shown in FIG. 10 is repeatedly executed every certain cycle.

3-1. Step S100

The control device 100 receives the detected information from the sensor group 20 and obtains various parameters representing a travel state of the vehicle 1.

3-2. Step S200

The control device 100 obtains the lateral acceleration ay of the vehicle 1. For example, the control device 100 can use the lateral acceleration ay detected by the lateral acceleration sensor 24. Alternatively, the control device 100 may calculate the lateral acceleration ay from other parameters. When the vehicle body slip angle 13 is small, the lateral acceleration ay is expressed by the following approximate expression (1).

[Equation 1]

$$ay \approx V(r+\dot{\beta}) \quad (1)$$

Here, the vehicle speed V is detected by the vehicle speed sensor 21. Alternatively, the vehicle speed V may be calculated based on the rotational speed of each wheel detected by the wheel speed sensor 22. The yaw rate r is detected by the yaw rate sensor 25. Alternatively, the yaw rate r may be calculated based on the vehicle speed V and the steering angle. The steering angle is detected by the steering angle sensor 23. The vehicle body slip angle β is detected by the vehicle body slip angle sensor 26.

The lateral acceleration ay or an approximate value of the lateral acceleration ay calculated based on the above Equation (1) and the like is collectively referred to as a "lateral acceleration equivalent". In the present embodiment, the lateral acceleration equivalent can be used instead of the lateral acceleration ay. In that case, the term "lateral acceleration" in the description of the present embodiment is appropriately replaced with the term "lateral acceleration equivalent". For the sake of readability, the term "lateral acceleration" is basically used in the description of the present embodiment.

3-3. Step S300

The control device 100 calculates the basic control yaw moment T_M according to the lateral acceleration ay (see FIG. 2). For example, the control device 100 uses the basic control yaw moment map MAP1 stored in the memory device 120. An input parameter to the basic control yaw moment map MAP1 is the lateral acceleration ay. The control device 100 can calculate the basic control yaw moment T_based on the lateral acceleration ay obtained at the above-mentioned Step S200 and the basic control yaw moment map MAP1.

3-4. Step S400

The control device 100 obtains the lateral jerk Jy of the vehicle 1. For example, the control device 100 can calculate the lateral jerk Jy by differentiating the lateral acceleration ay (lateral acceleration equivalent) obtained at the above-mentioned Step S200. Alternatively, the control device 100 may calculate the lateral jerk Jy in accordance with the following approximate expression (2).

[Equation 2]

$$Jy \approx V\frac{dr}{dt} \quad (2)$$

Here, the term "dr/dt" is a "yaw angular acceleration" being the time derivative of the yaw rate r. The yaw rate r is detected by the yaw rate sensor 25. Alternatively, the yaw rate r may be calculated based on the vehicle speed V and the steering angle. The vehicle speed V is detected by the vehicle speed sensor 21. Alternatively, the vehicle speed V may be calculated based on the rotational speed of each wheel detected by the wheel speed sensor 22. The steering angle is detected by the steering angle sensor 23.

The lateral jerk Jy or an approximate value of the lateral jerk Jy calculated based on the above Equation (2) and the like is collectively referred to as a "lateral jerk equivalent". In the present embodiment, the lateral jerk equivalent can be used instead of the lateral jerk Jy. In that case, the term "lateral jerk" in the description of the present embodiment is appropriately replaced with the term "lateral jerk equivalent". For the sake of readability, the term "lateral jerk" is basically used in the description of the present embodiment.

3-5. Step S500

The control device 100 calculates the limit control yaw moment A_M according to the lateral jerk Jy (see FIG. 5). For example, the control device 100 uses the limit control yaw moment map MAP2 stored in the memory device 120. An input parameter to the limit control yaw moment map MAP2 is the lateral jerk Jy. The control device 100 can calculate the limit control yaw moment A_M based on the lateral jerk Jy obtained at the above-mentioned Step S400 and the limit control yaw moment map MAP2.

It should be noted that the relationship between the lateral jerk Jy and the limit control yaw moment A_M may vary depending on parameters such as the vehicle speed V, a longitudinal acceleration, and the like. In consideration of such the variation in the relationship, plural types of the limit control yaw moment map MAP2 may be prepared in advance. In that case, the control device 100 obtains the parameters such as the vehicle speed V, the longitudinal acceleration, and the like to select and use the limit control yaw moment map MAP2 associated with the parameters.

3-6. Step S600

The control device 100 determines the hold control yaw moment H_M based on the limit control yaw moment A_M obtained at the above-mentioned Step S500. The hold control yaw moment H_M is the latest minimum value of the limit control yaw moment A_M and held until a predetermined release condition is satisfied. Various methods can be considered as Step S600. Concrete examples of Step S600 will be described later.

3-7. Step S700

The control device 100 determines the control yaw moment F_M used in the turning control. Here, the control device 100 determines the control yaw moment F_M so as not to exceed the hold control yaw moment H_M determined at the above-mentioned Step S600.

More specifically, the control device 100 compares the basic control yaw moment T_M obtained at the above-mentioned Step S300 with the hold control yaw moment H_M (Step S710). When the basic control yaw moment T_M is smaller than the hold control yaw moment H_M (Step S710: Yes), the control device 100 selects the basic control yaw moment T_M as the control yaw moment F_M (Step S720). On the other hand, when the basic control yaw moment T_M is equal to or greater than the hold control yaw moment H_M (Step S710: No), the control device 100 selects the hold control yaw moment H_M as the control yaw moment F_M (Step S730).

3-8. Step S800

The control device 100 controls the yaw moment generation device 30 such that the control yaw moment F_M determined at the above-mentioned Step S700 is generated. In other words, the control device 100 uses the yaw moment generation device 30 to generate the control yaw moment F_M. As a result, it is possible to increase the turning performance of the vehicle 1 while preventing the spin occurrence.

4. Processing Example of Step S600

Figure 11:
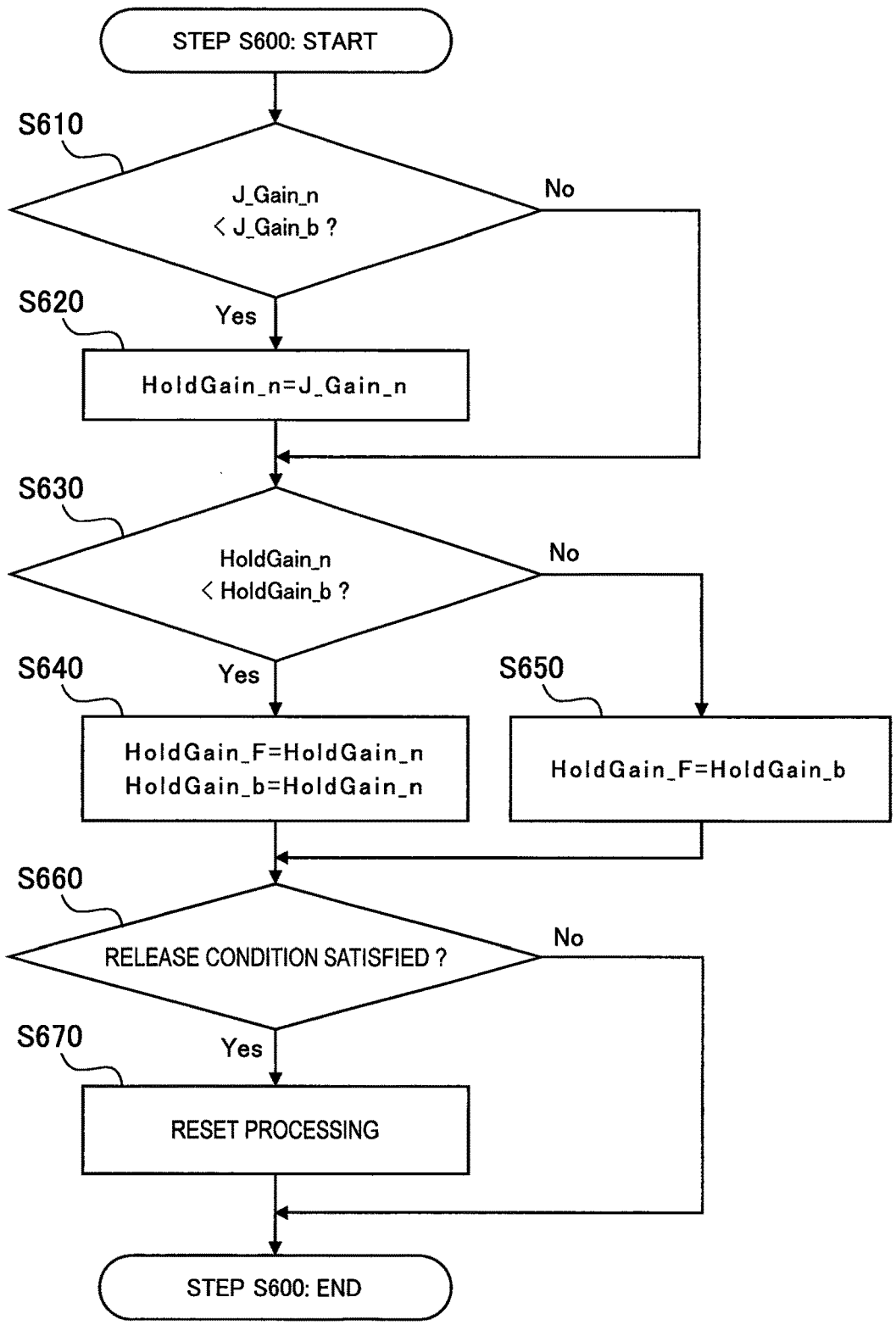
FIG. 11 is a flow chart showing a processing example of Step S600 in FIG. 10.

FIG. 11 is a flow chart showing a processing example of Step S600 in FIG. 10. In the description below, J_Gain represents the limit control yaw moment A_M calculated at the above-mentioned Step S500. J_Gain_n is a latest value of J_Gain, and J_Gain_b is a previous value of J_Gain. HoldGain is a variable used for determining the hold control yaw moment H_M. HoldGain n is a latest value of Hold Gain, and HoldGain b is a previous value of Hold_Gain. HoldGain_F corresponds to the hold control yaw moment H_M being the object of Step S600.

4-1. Step S610

The control device 100 makes a comparison between J_Gain_n and J_Gain_b. When J_Gain_n is smaller than J_Gain_b (Step S610: Yes), the processing proceeds to Step S620. Otherwise (Step S610: No), the processing skips Step S620 and proceeds to Step S630.

4-2. Step S620

The control device 100 updates HoldGain_n with J_Gain_n. After that, the processing proceeds to Step S630.

4-3. Step S630

The control device 100 makes a comparison between HoldGainn and HoldGain_b. When HoldGain_n is smaller than HoldGain_b (Step S630: Yes), the processing proceeds to Step S640. Otherwise (Step S630: No), the processing proceeds to Step S650.

4-4. Step S640

The control device 100 updates HoldGain_F and HoldGainb with HoldGain_n. After that, the processing proceeds to Step S660.

4-5. Step S650

The control device 100 maintains HoldGain F at HoldGain b.

The processing from Step S610 to Step S650 is summarized as follows. That is, when the latest value of the limit control yaw moment A_M (i.e. J_Gain_n, HoldGain_n) is less than the hold control yaw moment H_M (i.e. HoldGain b), the control device 100 updates the hold control yaw moment H_M (i.e. HoldGain_F) with the latest value (i.e. HoldGain_n). As a result, the hold control yaw moment H_M (i.e. HoldGain F) becomes the latest minimum value of the limit control yaw moment A_M.

4-6. Step S660

The control device 100 keeps holding (maintains) HoldGain_F until a predetermined release condition is satisfied. When the release condition is satisfied (Step S660: Yes), the processing proceeds to Step S670. On the other hand, when the release condition is not satisfied (Step S660: No), HoldGain_F is maintained without change and Step S600 ends.

Various examples are considered as the release condition in this Step S660.

FIRST EXAMPLE

Figure 12:
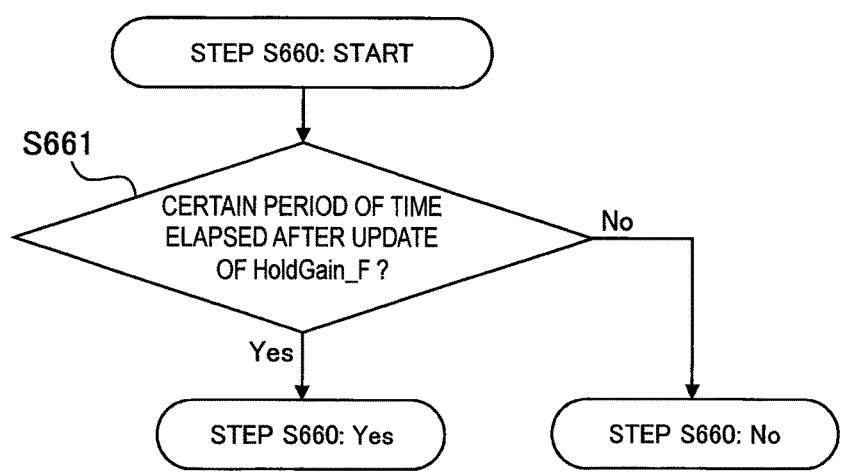
FIG. 12 is a flow chart showing a first example of processing of Step S660 in FIG. 11.

FIG. 12 is a flow chart for explaining a first example of the release condition. In the first example, the release condition is that "a certain period of time elapses after HoldGain_F is updated with HoldGain_n (J_Gain_n)". More specifically, the control device 100 resets a timer in response to update of HoldGain_F. When a certain period of time has elapsed thereafter (Step S661: Yes), the release condition is satisfied (Step S660: Yes). Otherwise (Step S661: No), the release condition is not satisfied (Step S660: No).

SECOND EXAMPLE

In a second example of the release condition, a "delayed lateral jerk J_LPF" is taken into consideration. The delayed lateral jerk J_LPF is the lateral jerk Jy whose phase is delayed. The control device 100 calculates the delayed lateral jerk J_LPF by delaying the phase of the lateral jerk Jy obtained at the above-mentioned Step S400. For example, the control device 100 calculates the delayed lateral jerk J_LPF by applying a low-pass filter to the lateral jerk Jy.

In the second example, the release condition is that "the delayed lateral jerk J_LPF is decreasing and the delayed lateral jerk J_LPF is less than a threshold value J_Enab". That is, when the delayed lateral jerk J_LPF becomes sufficiently low, the spin is hard to occur and thus holding of the hold control yaw moment H_M can be released. The reason why not the lateral jerk Jy but the delayed lateral jerk J_LPF is used is that the phase of the lateral jerk Jy is earlier than the phase of the lateral acceleration ay, as described in the foregoing FIG. 6.

Figure 13:
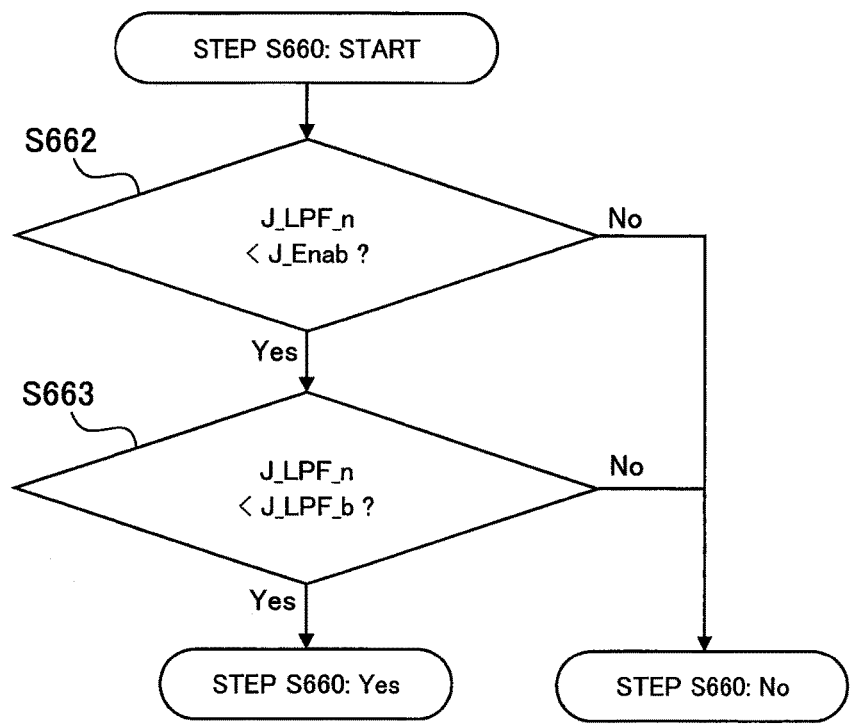
FIG. 13 is a flow chart showing a second example of processing of Step S660 in FIG. 11.

FIG. 13 is a flow chart for explaining the second example of the release condition. In FIG. 13, J_LPF n is a latest value of J_LPF, and J_LPF _b is a previous value of J_LPF. At Step S662, the control device 100 compares J_LPF_n with the threshold value J_Enab. When J_LPF n is less than the threshold value J_Enab (Step S662: Yes), the processing proceeds to Step S663. Otherwise (Step S662: No), the release condition is not satisfied (Step S660: No).

At Step S663, the control device 100 makes a comparison between J_LPF_n and J_LPF_b. When J_LPF_n is smaller than J_LPF_b, that is, when the delayed lateral jerk J_LPF is decreasing (Step S663: Yes), the release condition is satisfied (Step S660: Yes). Otherwise (Step S663: No), the release condition is not satisfied (Step S660: No).

THIRD EXAMPLE

In a third example the release condition is that "the lateral acceleration ay is decreasing and the lateral acceleration ay is less than a threshold value". That is, when the lateral acceleration ay becomes sufficiently low, the spin is hard to occur and thus holding of the hold control yaw moment H_M can be released.

4-7. Step S670

The control device 100 terminates the holding of Hold-Gain_F (i.e. the hold control yaw moment H_M) and resets HoldGain_F. For example, the control device 100 brings HoldGain_F closer to J_Gain_n.

Figure 14:
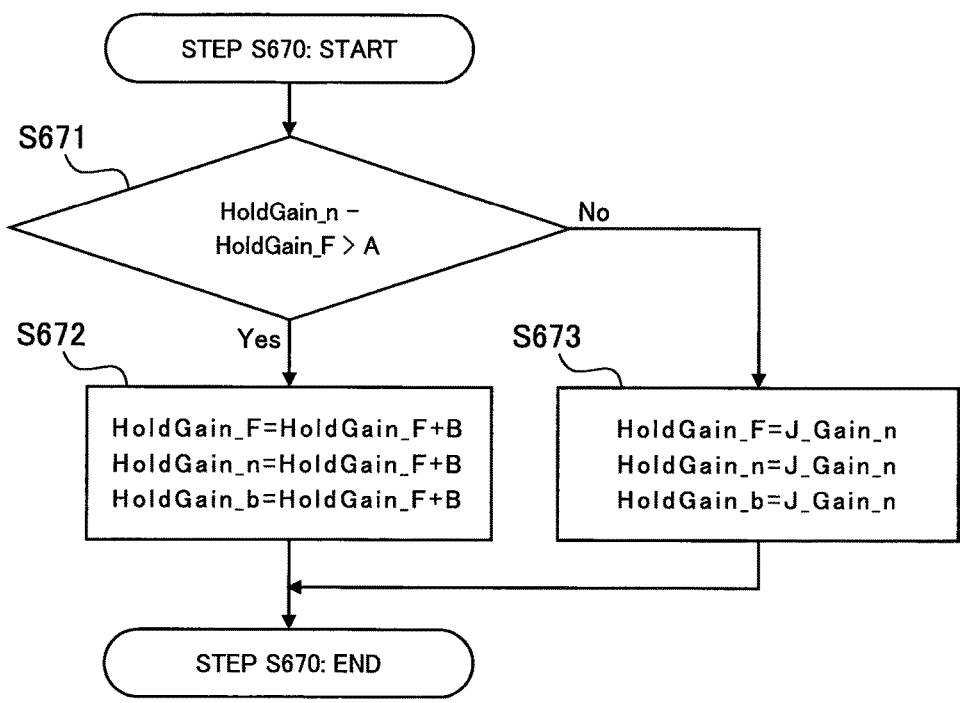
FIG. 14 is a flow chart showing an example of processing of Step S670 in FIG. 11.

FIG. 14 is a flow chart showing an example of processing of Step S670. At Step S671, the control device 100 compares a difference between HoldGain_n and HoldGain_F with a threshold value A. When the difference is larger than the threshold value A (Step S671: Yes), the control device 100 increases HoldGain_F and the like by a small value B (Step S672). On the other hand, when the difference is equal to or smaller than the threshold value A (Step S671: No), the control device 100 restores HoldGain_F and the like to J_Gain_n at once (Step S673).

5. Concrete Example

Figure 15:
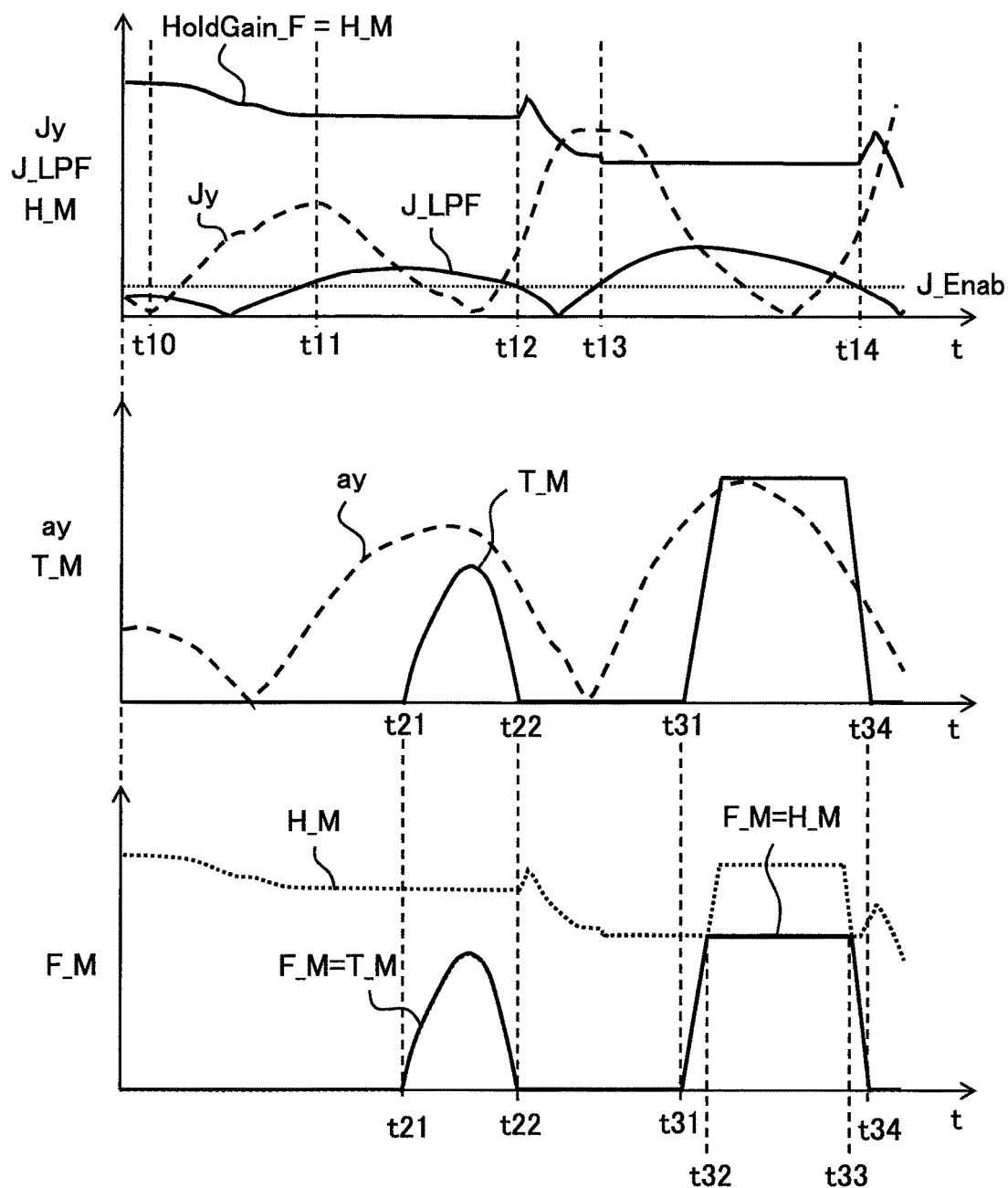
FIG. 15 is a timing chart showing a concrete example of the turning control according to the embodiment of the present disclosure.

FIG. 15 is a timing chart showing a concrete example of the turning control according to the present embodiment. In this example, the above-described second example of the release condition shown in FIG. 13 is used.

A top row of FIG. 15 shows respective time variations of the lateral jerk Jy, the delayed lateral jerk J_LPF, and the hold control yaw moment H_M (i.e. HoldGain_F). During a period from a time t10 to a time t11, the lateral jerk Jy increases gradually and J_Gain_n decreases gradually. As a result, HoldGain_F is sequentially updated and decreases gradually as well.

After the time t11, the lateral jerk Jy decreases gradually and J_Gain_n increases gradually. However, HoldGain_F is maintained at the latest minimum value. At a time t12, the delayed lateral jerk J_LPF being decreasing becomes less than the threshold value J_Enab, and thus the release condition is satisfied. Holding of HoldGain_F is terminated and HoldGain_F is reset.

In this manner, during a period from the time t11 to the time t12, the hold control yaw moment H_M (i.e. Hold-Gain_F) is held. Similarly, during a period from a time t13 to a time t14, the hold control yaw moment H_M is held.

A middle row of FIG. 15 shows respective time variations of the lateral acceleration ay and the basic control yaw moment T_M. In addition, a bottom row of FIG. 15 shows a time variation of the control yaw moment F_M. According to the present embodiment, as described above, a smaller one of the basic control yaw moment T_M and the hold control yaw moment H_M is selected as the control yaw moment F_M.

During a period from a time t21 to a time t22, values that are not zero are calculated as the basic control yaw moment T_M. During this period, the basic control yaw moment T_M is smaller than the hold control yaw moment H_M. Therefore, the basic control yaw moment T_M is used as the control yaw moment F_M (i.e. F_M=T_M). As a result, the turning performance increases.

During a period from a time t31 to a time t34, values that are not zero are calculated as the basic control yaw moment T_M. Especially, during a period from a time t32 to a time t33, the basic control yaw moment T_M is equal to or greater than the hold control yaw moment H_M. Therefore, during the period from the time t32 to the time t33, the hold control yaw moment H_M is used as the control yaw moment F_M (i.e. F_M=H_M). As a result, the spin of the vehicle 1 is prevented. During the other period, the basic control yaw moment T_M is used as the control yaw moment F_M (i.e. F_M=T_). As a result, the turning performance increases.

As described above, according to the present embodiment, it is possible to increase the turning performance of the vehicle 1 while preventing the spin occurrence. That is to say, it is possible to achieve a balance between increase in the turning performance and prevention of spin occurrence.

What is claimed is:

1. A vehicle turning control device mounted on a vehicle, comprising:
   a yaw moment generation device that generates a yaw moment; and
   a control device that calculates a control yaw moment for increasing turning performance of the vehicle and uses the yaw moment generation device to generate the control yaw moment, wherein
   a limit control yaw moment is an upper limit of an allowable range of the control yaw moment in which the vehicle does not spin,
   a lateral jerk equivalent is a lateral jerk of the vehicle or an approximate value of the lateral jerk,
   the limit control yaw moment is a function of the lateral jerk equivalent and decreases as the lateral jerk equivalent increases, and
   the control device performs:
   processing of calculating the limit control yaw moment based on the lateral jerk equivalent and the function;
   processing of updating a hold control yaw moment with a latest value of the limit control yaw moment, when the latest value is less than the hold control yaw moment; and
   processing of determining the control yaw moment so as not to exceed the hold control yaw moment.

2. The vehicle turning control device according to claim 1, wherein
   a lateral acceleration equivalent is a lateral acceleration of the vehicle or an approximate value of the lateral acceleration,
   the control device calculates a basic control yaw moment according to the lateral acceleration equivalent, and
   in the processing of determining the control yaw moment, the control device determines a smaller one of the basic control yaw moment and the hold control yaw moment as the control yaw moment.

3. The vehicle turning control device according to claim 1, wherein the control device holds the hold control yaw moment until a release condition is satisfied.

4. The vehicle turning control device according to claim 3, wherein
the release condition is that a certain period of time elapses after the hold control yaw moment is updated with the latest value.

5. The vehicle turning control device according to claim 3, wherein
the control device calculates a delayed lateral jerk equivalent by delaying a phase of the lateral jerk equivalent, and
the release condition is that the delayed lateral jerk equivalent is decreasing and the delayed lateral jerk equivalent is less than a threshold value.

6. The vehicle turning control device according to claim 5, wherein
the control device calculates the delayed lateral jerk equivalent by applying a low-pass filter to the lateral jerk equivalent.

7. The vehicle turning control device according to claim 3, wherein
after the release condition is satisfied, the control device brings the hold control yaw moment closer to the latest value of the limit control yaw moment.

* * * * *